US008646056B2

(12) United States Patent
Poplett

(10) Patent No.: US 8,646,056 B2
(45) Date of Patent: Feb. 4, 2014

(54) USER-FRIENDLY MULTIFACTOR MOBILE AUTHENTICATION

(75) Inventor: John Poplett, River Forest, IL (US)

(73) Assignee: U.S. Cellular Corporation, Chicago, IL (US)

( * ) Notice: Subject to any disclaimer, the term of this patent is extended or adjusted under 35 U.S.C. 154(b) by 1150 days.

(21) Appl. No.: 11/750,263

(22) Filed: May 17, 2007

(65) Prior Publication Data

US 2008/0289030 A1    Nov. 20, 2008

(51) Int. Cl.
*H04L 29/06* (2006.01)

(52) U.S. Cl.
USPC ........................... 726/7; 726/2; 726/3; 726/5

(58) Field of Classification Search
USPC ................................................. 726/2, 3, 5, 7
See application file for complete search history.

(56) References Cited

U.S. PATENT DOCUMENTS

| 7,108,177 | B2 | 9/2006 | Brookner |
| 2005/0061879 | A1* | 3/2005 | Honda .......................... 235/385 |
| 2005/0075079 | A1 | 4/2005 | Jei et al. |
| 2005/0278775 | A1* | 12/2005 | Ross .................................. 726/2 |
| 2006/0022799 | A1* | 2/2006 | Juels ........................... 340/10.1 |
| 2006/0040692 | A1* | 2/2006 | Anttila et al. ................. 455/519 |
| 2006/0080322 | A1* | 4/2006 | Akashika et al. ............... 707/10 |
| 2006/0111053 | A1 | 5/2006 | Wu et al. |
| 2006/0158310 | A1 | 7/2006 | Klatsmanyi et al. |
| 2006/0169771 | A1* | 8/2006 | Brookner ...................... 235/382 |
| 2006/0179079 | A1* | 8/2006 | Kolehmainen ............. 707/104.1 |
| 2006/0208890 | A1 | 9/2006 | Ehrman et al. |
| 2006/0208891 | A1 | 9/2006 | Ehrman et al. |
| 2006/0208892 | A1 | 9/2006 | Ehrman et al. |
| 2006/0229113 | A1* | 10/2006 | Rowse .......................... 455/574 |
| 2006/0252374 | A1 | 11/2006 | Ban et al. |
| 2007/0004381 | A1* | 1/2007 | Larson et al. ................. 455/411 |
| 2007/0008228 | A1 | 1/2007 | Yamada et al. |
| 2007/0013488 | A1* | 1/2007 | Hayashi ..................... 340/10.51 |
| 2007/0066221 | A1 | 3/2007 | Shim et al. |
| 2007/0178882 | A1* | 8/2007 | Teunissen et al. ............. 455/411 |
| 2007/0203850 | A1* | 8/2007 | Singh et al. ..................... 705/67 |

OTHER PUBLICATIONS

"eWallet Your Important Info—Secure & Convenient in a Digital Wallet," obtained from the internet at http://www.iliumsoft.com/site/ew/ewallet.htm on Apr. 11, 2007 (No specified date, but not later than applicant's filing date) (2 pages).

(Continued)

*Primary Examiner* — Bradley Holder
(74) *Attorney, Agent, or Firm* — Leydig, Voit & Mayer, Ltd.

(57) ABSTRACT

A system and method for performing multifactor mobile authentication are described whereby a mobile communications device includes a contactless reader for receiving and validating a unique identifier stored in an external authenticating module prior to granting access to locally stored electronic authenticating material required to access an external resource. In one embodiment, the mobile communications device is a mobile telephone having an RFID reader for receiving the unique identifier from an RFID tag incorporated into the external authenticating module. Preferably, the external authenticating module is associated with a user, such as by being part of the user's jewelry or clothing. The mobile authentication device includes an RFID authenticator module that detects external resource access requests and checks whether the requested resource is on a list of resources that require additional user authentication prior to granting access to locally stored authenticating material.

7 Claims, 3 Drawing Sheets

(56) References Cited

OTHER PUBLICATIONS

"eWallet, eWallet Features," obtained from the internet at http://www.iliumsoft.com/site/ew/ew_feats.htm on Apr. 11, 2007 (No specified date, but not later than applicant's filing date) (2 pages).

The FIDIS *consortium-EC Contract No. 507512*, "Study on Mobile Identity Management," obtained from the internet at http://www.fidis.net/fileadmin/fidis/deliverables/fidis-wp3-del3.3.study_on_mobile_identity_management.pdf on May 18, 2007 (May 9, 2005) (90 pages).

Franks et al. "HTTP Authentication: Basic and Digest Access Authentication" obtained from the internet at http://www.ietf.org/rfc/rfc2617.txt on Mar. 22, 207 (Jun. 1999) (32 pages).

"NFC Forum : Frequently Asked Question" obtained from the internet at http://www.nfc-forum.org/resources/faqs/ on Mar. 22, 2007 (Copyright 2007) (8 pages).

"Nokia Unveils RFID Phone Reader" *RFiD Journal* obtained from the internet at http://www.rfidjournal.com/article/articleview/834/1/1/ on Mar. 21, 2007 (Mar. 17, 2004) (3 pages).

\* cited by examiner

USER-FRIENDLY MULTIFACTOR MOBILE AUTHENTICATION

FIELD OF THE INVENTION

This invention relates generally to the field of telecommunications and more specifically to the field of authentication of mobile devices.

BACKGROUND OF THE INVENTION

Modern distributed networks often span multiple network mediums and provide a user with access to information and services hosted by a multitude of network resources. For example, it is not uncommon for a remote user to be accessing an on-line banking service, a corporate network, or stream digital media from a remote server connected to the Internet. The resulting interchange of sensitive data and access to premium or protected information necessitate effective user authentication prior to granting access to protected resources.

In general, authentication involves verification of user's identity by matching the information that originates from the user's knowledge, an article in user's possession, or a user's personal attribute. Authentication via information known to the user typically involves matching a user-supplied password, a personal identification number (PIN), or a pass phrase. Typical examples of authentication via an article in the user's possession and via a user's personal attribute respectively involve possession of a smartcard of the type used to pay for public transportation and verification of biometric factors, such as fingerprints or iris patterns.

Authentication methods that require a single form of authentication, for example a password, are referred to as one-factor authentication. Generally, one-factor authentication methods differ in degree of security and reliability. For example, biometric authentication methods, such as fingerprint scanning, are relatively expensive to implement and may be prone to scanning errors, while manual password entry is subject to key-logging attacks. Due to the ever-growing security concerns, it is becoming increasingly common for authentication systems to require multiple authenticating factors. In a two-factor authentication procedure, the user provides two sets of authenticating material (e.g., two passwords). Two-factor authentication is generally deemed to provide stronger security by complicating the would-be attacker's task.

Two-factor authentication is also increasingly common in a mobile environment where mobile devices, including mobile phones, are frequently used to access remote server resources connected to the Internet, as well as to perform point-of-sale transactions. However, the increase in security associated with multifactor authentication comes at a cost: multifactor methods, including two-factor authentication, are generally less convenient for the user than one-factor methods due to the increase in the authenticating information required from the user. Each time a user wishes to access privileged content or a privileged service, he or she must supply extra authenticating factor(s). In the case of dual password authentication, the user must remember two separate passwords, for example. These issues are further exacerbated in a fast-paced mobile environment where a user needs to enter an additional PIN, password, or pass phrase via a small keyboard or dial pad, which is typically an inconvenient and time-consuming process. Typical mobile password database applications, for example, require manual entry of initial login information prior to granting access to the stored password, PIN, and pass phrase material necessary to access a privileged external resource. Furthermore, manual entry of additional authenticating factors does not solve the security risks associated with password, PIN, and pass phrase theft by nearby on-lookers or by key-logging malware within the mobile device.

BRIEF SUMMARY OF THE INVENTION

Embodiments of the invention are used to provide user-friendly multifactor mobile authentication by way of validation via an external authenticating module that helps prevent unauthorized access to the electronic authenticating material stored on a mobile communications device and removes the need for memorization and manual entry of authenticating information. To gain access to an external resource, the mobile communications device preferably performs a two-factor authentication procedure by initially authenticating a user via the external authenticating module and subsequently conveying another authenticating factor chosen among the locally stored electronic authenticating material.

The mobile communications device includes a contactless reader for wirelessly receiving and validating a unique identifier stored in the external authenticating module located in its proximity prior to granting access to locally stored electronic authenticating material required by an external resource. In one embodiment, the mobile communications device is a mobile telephone having an RFID reader for receiving the unique identifier from an RFID tag incorporated into the external authenticating module. Preferably, the external authenticating module is associated with a user, such as by being part of or attached to the user's jewelry or clothing.

In embodiments, electronic authenticating material stored on the mobile communications device includes one or more of a username and password, a pass phrase, a personal identification number (PIN), a digital certificate, and/or an NFC identifier. The external resources include a secure web server, a VPN server, and a Near Field Communication (NFC) device.

The mobile authentication device includes an RFID authenticator module that detects external resource access requests and checks whether the requested resource is on a list of resources that require additional user authentication prior to granting access to locally stored authentication material. If the external resource is on the multifactor authentication list, the RFID authenticator module queries the RFID reader for the presence of the external authenticating module and grants access to the locally-stored electronic authentication material upon receiving and validating the RFID number from the RFID tag. To validate the user's identity, the RFID authenticator module matches the received RFID number with a corresponding number pre-programmed in the mobile device's secure memory area. Upon initial user authentication, the mobile communications device reads the username/password, pass phrase, or PIN information from its secure memory area and communicates this information to the requested resource via its corresponding communications protocol, including HTTP Digest, SSL, TLS, TCP, or NFC protocols.

In one aspect of the invention, a method is provided for gaining access to an external resource from a mobile communications device, wherein the access to the external resource requires a plurality of authenticating factors, the method comprising detecting a request to access the external resource requiring authentication via electronic authenticating material stored in the mobile communications device, detecting presence of an external authenticating module in proximity to the mobile communications device, allowing access to the electronic authenticating material in response to validating a unique identifier received from the external authenticating module as one of the plurality of authenticating factors, and communicating information associated with the electronic authenticating material to the external resource as another one of the plurality of authenticating factors.

In another aspect of the invention, a mobile communications device is provided for accessing an external resource via a plurality of authenticating factors, the mobile communications device comprising a processor, memory for storing electronic authenticating material, at least one contactless reader capable of receiving a unique identifier to provide access to the electronic authenticating material as one of the plurality of authenticating factors, and a communications interface for sending the information associated with the electronic authenticating material to the external resource as another one of the authenticating factors.

In still another aspect of the invention, a system is provided for accessing an external resource from a mobile communications device via a plurality of authenticating factors, the system comprising the mobile communications device having stored thereon electronic authenticating material, the electronic authenticating material comprising one of the plurality of authenticating factors for accessing the external resource, an external authenticating module having stored thereon a unique identifier for providing access to the electronic authenticating material in the mobile communications device as another one of the plurality of authenticating factors, and wherein the mobile communications device comprises at least one contactless reader for receiving the unique identifier from the external authenticating module when the mobile communications device detects an authentication attempt requiring access to the electronic authenticating material and the external authenticating module is in proximity to the mobile communications device.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate the invention but, of course, should not be construed as in any way limiting its scope.

Figure 1:
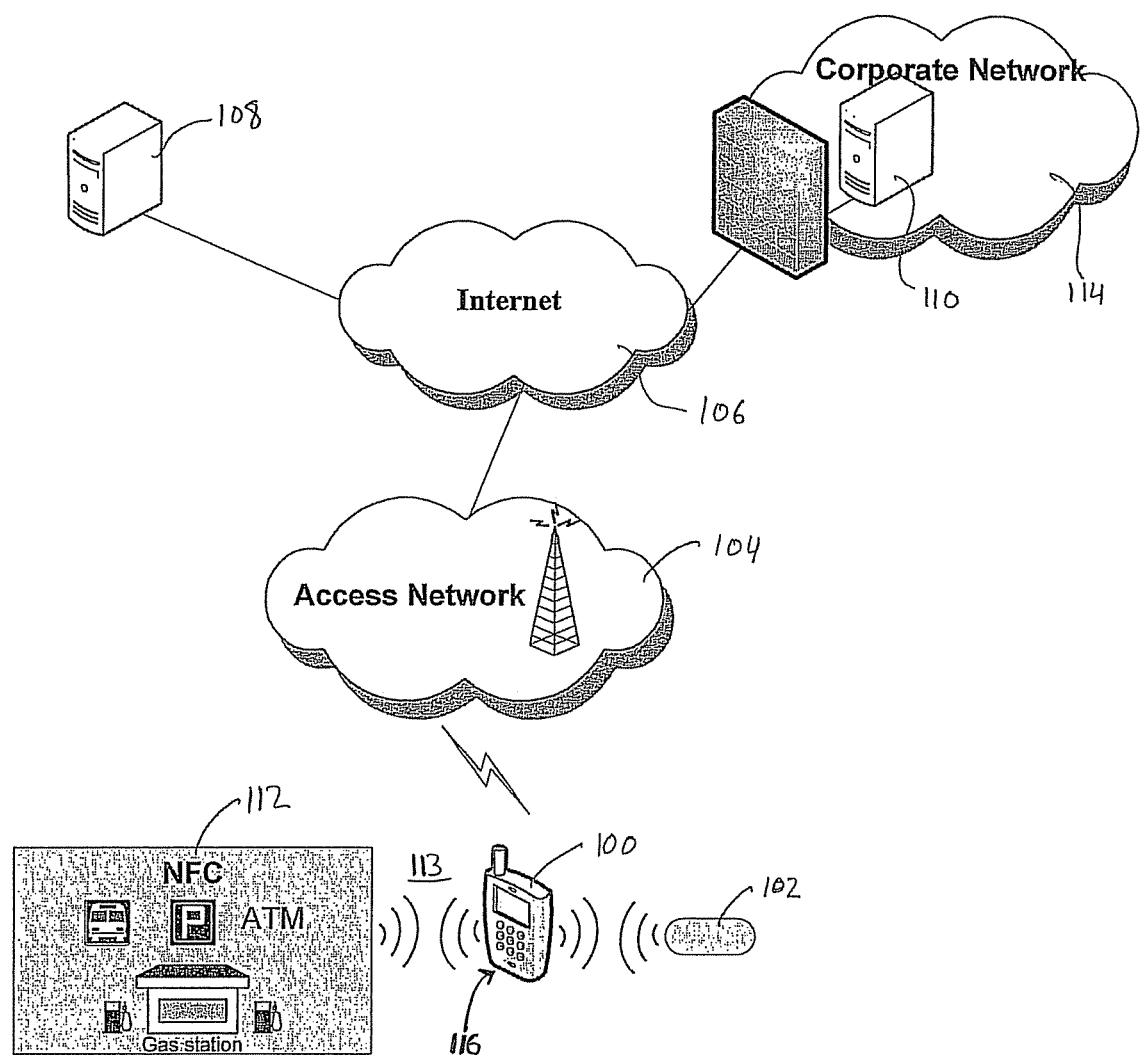
FIG. 1 is a schematic diagram illustrating a mobile network environment contemplated by an embodiment of the invention.

Turning to FIG. 1, an implementation of a system contemplated by an embodiment of the invention is shown with reference to a mobile network environment. The mobile communications device 100 collects multiple authenticating factors in order to establish a communications session with one or more external resources 108-112. To enhance the user authentication process, the mobile communications device 100 includes a contactless reader for automatically collecting and validating a unique identifier stored on an external authenticating module 102 located in its proximity prior to granting access to memory locations that store additional electronic authenticating material 116. In the illustrated embodiment, the mobile communications device 100 is a mobile telephone capable of establishing a communications session with external resources 108, 110 via a network 104, as well as capable of directly connecting to an external resource 112 via a communications link 113. Alternatively, the mobile communications device 100 is a portable computer, such as a laptop, or a personal digital assistant (PDA) having network communication interfaces for connecting to the network 104. Preferably, the network 104 is a wireless wide area network, such as of the type employing a cellular-based wireless standard. In embodiments, the network 104 relies on CDMA 2000 1X, 1xEV-DO, 1xEV-DV, GSM, GPRS, EDGE, HSPDA, UMTS, LTE (3GPP Long Term Evolution), or UMB (Ultra Mobile Broadband) network access technology. In other embodiments, the network 104 is a LAN, a WLAN (e.g., Wi-Fi®), or a WiMAX® network.

To gain access to an external resource 108-112, the mobile communications device 100 preferably performs a two-factor authentication procedure by initially authenticating a user via the external authenticating module 102 and subsequently conveying another authenticating factor chosen among the locally stored electronic authenticating material 116. To this end, the mobile communications device 100 includes a contactless reader, such as an RFID reader, for wirelessly (e.g., inductively) coupling to an external authenticating module 102. The external authenticating module 102 is capable of communicating a unique identifier associated with a user in order to validate the user's identity and provide one of the two authenticating factors without the need to manually enter a pass phrase or other user authentication information. Physical possession of the mobile communications device 100 having locally stored electronic authenticating material 116 serves as another authenticating factor. Preferably, the local electronic authenticating material 116 is stored in a secure memory location of the mobile communications device 100. Alternatively, the local authenticating material 116 resides in a secure memory location of a removable storage card associated with the mobile communications device 100, such as a SIM card.

To decrease the possibility of loss, the external authenticating module 102 is associated with a user of the mobile communications device 100 and preferably comprises an RFID tag embedded into a personal object of the user. In one embodiment, the authenticating module 102 is incorporated into the user's personal jewelry, such as a wristwatch, a keychain, a bracelet, or a pendant. In another embodiment, the external authenticating module 102 is implanted into a user's clothing. Alternatively, the external authenticating module 102 is incorporated into a plastic card of the size suitable to be stored in a user's wallet. In yet another embodiment, the external authenticating module 102 is permanently associated with the user's body, such as via subcutaneous implantation.

When the external authenticating module 102 includes an RFID tag, the unique user identifier comprises a serial number portion of an Electronic Product Code (EPC) stored on the tag. EPC's are typically available in sixty four (64) and ninety six (96) bit formats. The format of an EPC code includes header, manager number, object class, and serial number fields. The header field is governed by a standards body and is typically common to all identifiers. The manager number identifies an entity, such as a company, that administers a number space for the RFID tag, including the object class and serial number bits. In an embodiment, a mobile communications device manufacturer manages the number space for the RFID tag associated with the external authenticating module 102. In this case, the mobile communications device 100 recognizes only the RFID tags with a manager number field corresponding to the manufacturer and having particular object class and serial number values. Secure memory of the mobile communications device 100 includes an EPC serial number field corresponding to the user. The EPC serial number stored in the mobile communications device 100 is cross-referenced with one or more RFID tags having identical predetermined EPC values. In another embodiment, the manager number field belongs to an industry trade consortium and is shared among multiple manufacturers of the mobile communications device 100.

Upon detecting a request to access one or more of the external resources 108-112, the mobile communications device 100 initially searches for presence of the external authenticating module 102 in its proximity in order to receive the unique identifier necessary for granting access to the electronic authenticating material 116. Once the mobile communications device 100 validates the unique identifier received from the external authenticating module 102, the mobile communications device accesses the locally stored electronic authenticating material 116 and communicates the associated information to one or more external resources 108-112. The electronic authenticating material 116 stored on the mobile communications device 100 includes one or more of a username and password, a pass phrase, a personal identification number (PIN), a digital certificate, and/or an NFC identifier. When the requested resources includes a secure web server 108 or a VPN server 110 the mobile communications device 100 communicates the information associated with the locally stored electronic authenticating material 116 to the external resources 108, 110 by accessing the network 104 and establishing a communications session via the Internet 106. The secure web server 108 hosts a secure web application requiring authentication via at least one electronic authenticating factor chosen among electronic authenticating material 116 stored on the mobile communications device 100. Exemplary embodiments of an application hosted by a secure web server 108 include an online banking application, an internet commerce application, as well as a media streaming or media downloading service. Similarly, the VPN server 110 hosts one or more enterprise applications residing on a corporate network 114, which also requires authentication via electronic authenticating material 116 residing on the mobile communications device 100.

When the requested resources include a Near Field Communication (NFC) device 112, the mobile communications device 100 establishes a communications session directly with the NFC device 112 via a wireless communications link 113 in accordance with an NFC protocol. The NFC device 112 includes an NFC protocol compatible device that requires authentication to communicate with the mobile communications device 100, such as for purposes of providing mobile payment, mobile ticketing, user identification, or access control functionality. In embodiments, the NFC device 112 comprises a point-of-sale device, such as a check-out register, or an unattended payment machine, such as a parking meter. The NFC device 112 also includes electronically activated door lock devices for controlling physical access to buildings. In yet another embodiment, the NFC device 112 is a computer or a computer network access point that requires authentication via electronic authenticating material 116 stored on the mobile communications device 100.

Figure 2:
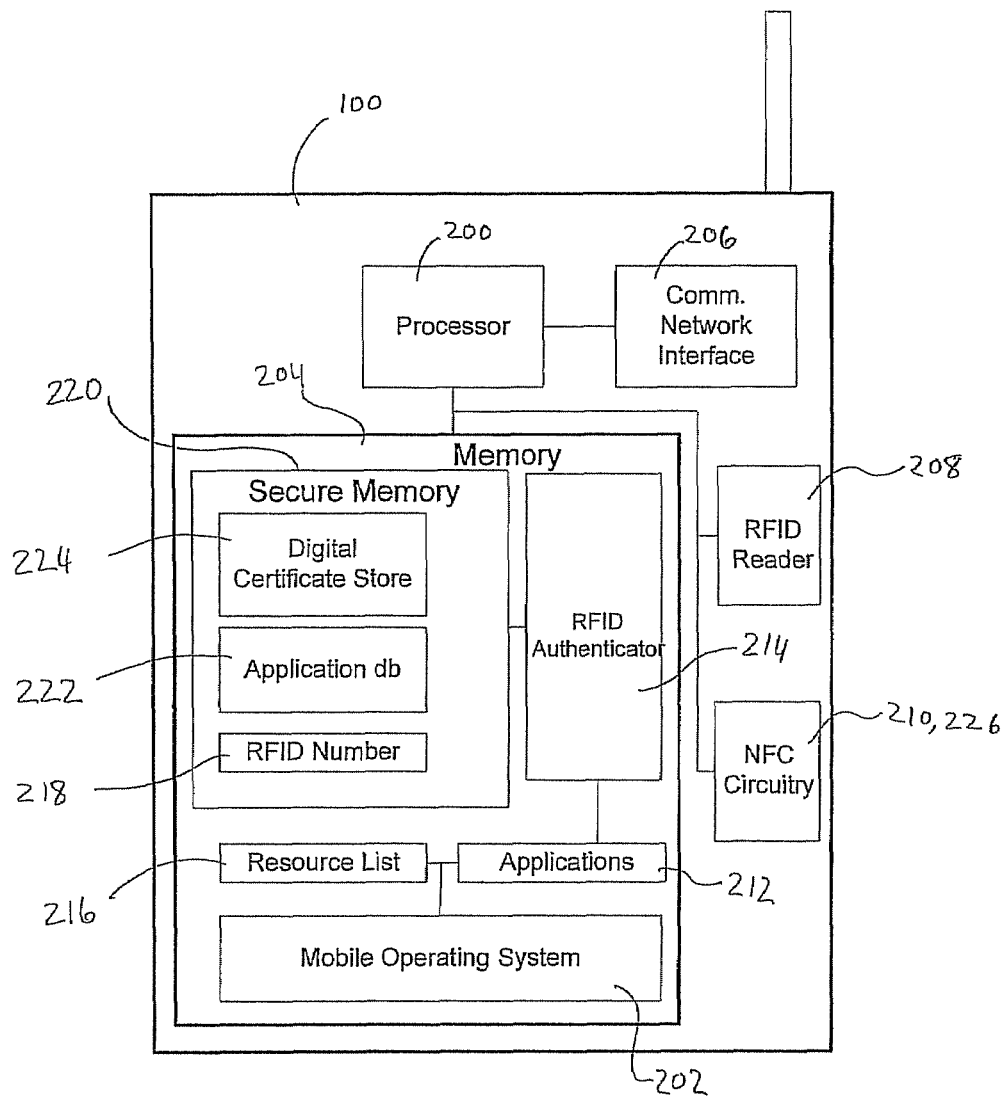
FIG. 2 is a schematic diagram illustrating a particular embodiment of the mobile communications device of FIG. 1.

Turning to FIG. 2, an embodiment of a mobile communications device 100 is shown. The processor 200 interfaces with the mobile device operating system 202 to manage the operation of memory 204, communications network interface 206, RFID reader 208, and NFC circuitry 210. The communications network interface 206 is of the type compatible with the access network 104. When the mobile communications device 100 launches an application 212, which requires access to one of the external resources 108-112, the RFID authenticator module 214 detects the access request and checks whether the requested resource is on the list 216 of resources that require additional user authentication prior to granting access to locally stored electronic authenticating material 116. The multifactor authentication list 216 is compiled when mobile applications making use of one or more external resources 108-112 are loaded onto the mobile communications device 100. If the external resource is on the multifactor authentication list 216, the RFID authenticator module 214 queries the RFID reader 208 for the presence of the external authenticating module 102 in the immediate proximity of the mobile device 100. The RFID reader 208, in turn, scans for the presence of the external authenticating module 102 to report a unique identifier, such as an RFID number (i.e., an EPC value), associated with an RFID tag of the external authenticating module 102 to the RFID authenticator 214. The RFID authenticator 214 grants access to the stored electronic authentication material 116 once it validates the received RFID number by matching it with a corresponding number 218 pre-programmed in the mobile device's secure memory area 220.

Thus, when a mobile web browser application, for example, requests access to a secure web service resource, such as a web server 108 hosting an online banking application, the web browser application retrieves the user's username and password stored in the application database 222 only after the RFID authenticator 214 has validated the user via the RFID number received from the external authenticating module 102. In one embodiment, the application database 222 is a mobile password manager application, such as "eWallet" available from Ilium Software, Inc., for storing the mobile user's username/password, pass phrase, and/or PIN information required for authentication with an external resource 108. In another embodiment, the application database 222 is an Internet cookie database used by the mobile device's web browser to store username/password, pass phrase, and/or PIN information associated with previously visited web sites.

Upon initial user authentication via the RFID number, the mobile communications device 100 reads the username/password, pass phrase, or PIN information from the application database 222 and communicates this information to the secure web server 108 via an HTTP Digest, SSL, or TLS security protocols. Similarly, upon initial RFID authentication, the mobile communications device 100 reads the digital certificate information stored in the digital certificate store 224 and communicates this information to the VPN server 110 via a protocol such as TCP. Alternatively, the mobile communications device 100 accesses the application database 222 to communicate the username/password, pass phrase, or PIN information to the VPN server 110. To access the NFC device 112 after completing the initial RFID authentication, the mobile communications device 100 reads the addressable memory locations of the NFC chipset or circuitry 210 to communicate the NFC identifier 226 stored therein to the NFC device 112 via the NFC protocol. In another embodiment, the NFC identifier 226 is stored in the memory of the mobile communications device 100. In this case, the communications device 100 obtains the NFC identifier information by addressing the secure memory area 220. Alternatively, the NFC identifier 226 is stored on a removable storage card associated with the mobile communications device 100, such as a SIM module.

In the illustrated embodiment, the RFID authenticator module 214 is a software component, such as a BREW platform extension, residing in memory 204. The RFID authenticator 214 detects access requests to external resources 108-112 by interfacing with the operating system 202 and mobile applications 212 via an application programming interface (API). Other embodiments include a firmware implementation of the RFID authenticator 214.

Figure 3:
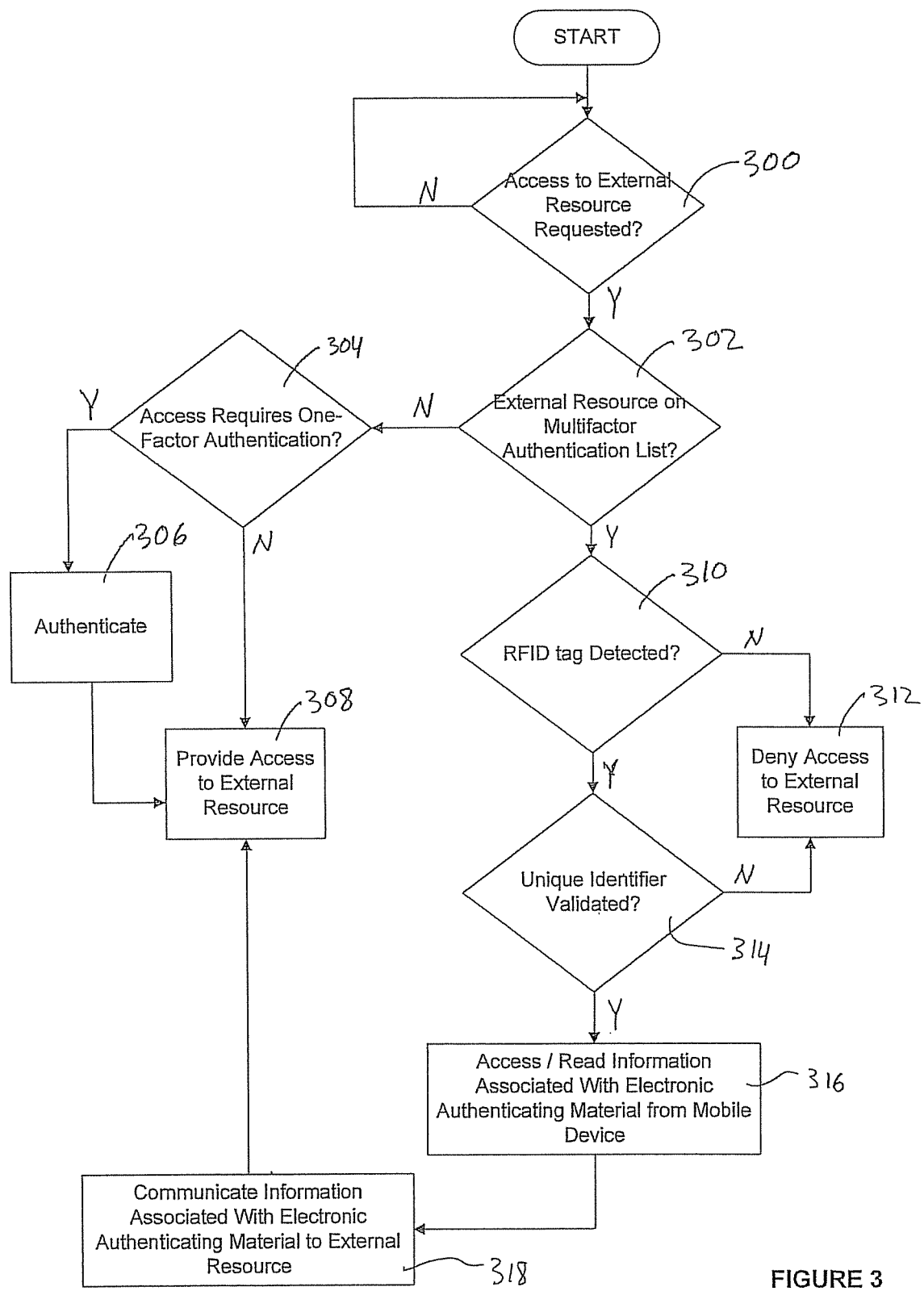
FIG. 3 is a flow chart illustrating an embodiment of a method for gaining access to an external resource from a mobile communications device of FIG. 1 via a plurality of authenticating factors, in accordance with an embodiment of the invention.

Turning to FIG. 3, an embodiment of a method for gaining access to an external resource from a mobile communications device via a plurality of authenticating factors is shown. Specifically, in step 300, if the RFID authenticator 214 detects that a mobile application is requesting access to an external resource, the RFID authenticator 214 checks whether the external resource is on the list of resources for which multifactor authentication is required, step 302. If the requested resource is not on the multifactor authentication list, then, in step 304, the application requesting access to the external resource verifies whether one factor authentication is required. If so, in step 306, the requesting application provides the necessary authenticating factor to the requested resource, such as by requesting user input or otherwise accessing the authenticating information. Subsequently, in step 308, the mobile communications device 100 gains access to the requested resource. Additionally, if the external resource does not require authentication, the mobile communications device 100 gains immediate access to the requested resource. If, however, the requested resource is on the multifactor authentication list, then the RFID authenticator 214 instructs the RFID reader 208 to scan for the presence of an RFID tag incorporated into the external authenticating module 102, step 310. In step 312, access to the external resource is denied if the RFID) authenticator 214 fails to detect the presence of the external authenticating module 102, or when the received RFID number does not match the unique identifier stored in the mobile communications device 100, step 314. If, however, the RFID authenticator 214 validates the received RFID number, the requesting application is allowed to read the information associated with the locally stored electronic authenticating material 116, step 316. Therefore, the requesting application gains access to the desired external resource in step 308 upon communicating the information associated with the corresponding electronic authenticating material 116 in step 318.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for gaining authenticated access to an external resource from a mobile communications device (MCD):

detecting, by the MCD, a user request to obtain access to the external resource via the MCD;

detecting whether the external resource is listed on a multifactor authentication list (MAL) stored in the MCD, the MAL comprising a listing of external resources accessible via multifactor authentication, the MAL providing an indication, for each listed external resource, that access to the listed external resource may be obtained through multifactor authentication incorporating a plurality of authenticating factors including:

electronic authenticating material stored in the MCD, and a unique identifier stored on an external authenticating module;

in response to detecting, using the MAL, that the external resource is accessible via multifactor authentication using the plurality of authenticating factors, performing, by the MCD, the following:

(a) detecting the external authenticating module in proximity to the MCD;

(b) allowing access to the electronic authenticating material stored in the MCD in response to validating the unique identifier received from the external authenticating module as one of the plurality of authenticating factors; and (c) communicating information associated with the electronic authenticating material stored in the MCD to the external resource as another one of the plurality of authenticating factors, wherein the MCD is one of the group consisting of: a mobile telephone, a personal digital assistant and a portable computer, wherein the MCD further comprises a radio frequency identification (RFID) reader and an RFID authenticator module including instructions for validating the unique identifier received from the external authenticating module, wherein the electronic authenticating material comprises at least one of the group consisting of: a digital certificate, a near field communication (NFC) identifier, a username and password, and a personal identification number, and wherein the external resource comprises at least one of the group consisting of: a secure web application, a virtual private network (VPN) server, and an NFC device.

2. The method of claim 1 wherein the external authenticating module comprises an RFID tag associated with a user of the MCD.

3. The method of claim 1 further comprising communicating the information associated with the electronic authenticating material via a communications protocol selected from the group consisting of: a secure sockets layer (SSL) protocol, a transport layer security (TLS) protocol, a near field communication (NFC) protocol, a hypertext transfer protocol (HTTP) Digest protocol, and a transmission control protocol (TCP) protocol.

4. A mobile communications device (MCD) for providing access to an external resource via a plurality of authenticating factors in accordance with a user request, the MCD comprising:
   a hardware processor;
   memory configured to store electronic authenticating material associated with external resources listed on a multifactor authentication list (MAL);
   an authenticator module including instructions for detecting whether the external resource is listed on the MAL, the MAL comprising a listing of external resources accessible via multifactor authentication, the MAL providing an indication, for each listed external resource, that access to the external resource may be obtained through multifactor authentication, the plurality of authenticating factors including:
   the electronic authenticating material as one of the plurality of authenticating factors, and
   a unique identifier stored on an external authenticating module hardware device as another one of the plurality of authenticating factors;
   at least one contactless reader, the contactless reader including an interface to receive the unique identifier provided by the external authenticating module hardware device to enable access to the electronic authenticating material, wherein the unique identifier is received by the contactless reader in response to detecting that the external resource is listed on the MAL; and
   a communications interface including instructions for sending information associated with the electronic authenticating material to the external resource in accordance with multifactor authentication of the user request for access to the external resource;
   wherein the MCD is one of the group consisting of: a mobile telephone, a personal digital assistant and a portable computer,
   wherein the MCD further comprises a radio frequency identification (RFID) reader and an RFID authenticator module including instructions for validating the unique identifier received from the external authenticating module,
   wherein the electronic authenticating material comprises at least one of the group consisting of: a digital certificate, a near field communication (NFC) identifier, a username and password, and a personal identification number, and
   wherein the external resource comprises at least one of the group consisting of: a secure web application, a virtual private network (VPN) server, and an NFC device.

5. The MCD of claim 4 wherein the communications interface connects to the external resource via a communications protocol selected from the group consisting of: a secure sockets layer (SSL) protocol, a transport layer security (TLS) protocol, a near field communication (NFC) protocol, a hypertext transfer protocol (HTTP) Digest protocol, and a transmission control protocol (TCP) protocol.

6. A system for providing access to an external resource from a mobile communications device (MCD) via a plurality of authenticating factors in accordance with a user request, the system comprising:
   the MCD having a hardware processor and a non-transitory computer-readable medium;
   the MCD having stored thereon electronic authenticating material associated with an external resource listed on a multifactor authentication list (MAL), the MAL comprising a listing of external resources accessible via multifactor authentication, the MAL providing, for each listed external resource, an indication that access to the external resource may be obtained through multifactor authentication including the plurality of authenticating factors;
   an external authenticating module hardware device having stored thereon, as one of the plurality of authenticating factors, a unique identifier enabling access to the electronic authenticating material stored in the MCD; and
   wherein the MCD comprises at least one contactless reader, the contactless reader including an interface to receive the unique identifier from the external authenticating module hardware device when:
   (a) the MCD detects a request to access the external resource listed on the MAL, and
   (b) the external authenticating module is in proximity to the MCD,
   wherein the MCD communicates information associated with the electronic authenticating material stored in the MCD to the external resource as another one of the plurality of authenticating factors,
   wherein the MCD is one of the group consisting of: a mobile telephone, a personal digital assistant and a portable computer,
   wherein the MCD further comprises a radio frequency identification (RFID) reader and an RFID authenticator module including instructions for validating the unique identifier received from the external authenticating module,
   wherein the electronic authenticating material comprises at least one of the group consisting of: a digital certificate, a near field communication (NFC) identifier, a username and password, and a personal identification number, and
   wherein the external resource comprises at least one of the group consisting of: a secure web application, a virtual private network (VPN) server, and an NFC device.

7. The system of claim 6 wherein the MCD sends information associated with the electronic authenticating material to the external resource via a communications protocol selected from the group consisting of: a secure sockets layer (SSL) protocol, a transport layer security (TLS) protocol, a near field communication (NFC) protocol, a hypertext transfer protocol (HTTP) Digest protocol, and a transmission control protocol (TCP) protocol.

* * * * *